United States Patent [19]

Johnson

[11] 4,347,696
[45] Sep. 7, 1982

[54] MODULE DUMP
[75] Inventor: Don R. Johnson, Lubbock, Tex.
[73] Assignee: Harris & Thrush Manufacturing Company, Wolfforth, Tex.
[21] Appl. No.: 245,747
[22] Filed: Mar. 20, 1981
[51] Int. Cl.³ .................. A01D 44/00; A01D 46/08; A01D 46/20
[52] U.S. Cl. ...................................... 56/16.6; 56/28; 56/DIG. 2
[58] Field of Search ............. 56/16.6, 28, 30, DIG. 2, 56/1; 414/345, 320, 321, 499, 400, 286

[56] References Cited
U.S. PATENT DOCUMENTS

| | | | |
|---|---|---|---|
| 3,147,870 | 9/1964 | Urban et al. | 414/345 |
| 3,342,358 | 9/1967 | French et al. | 414/345 |
| 3,528,230 | 9/1970 | Simpson | 56/16.6 |
| 3,529,408 | 9/1970 | Stark et al. | 56/16.6 |
| 3,790,011 | 2/1974 | Owen, Jr. | 414/345 |
| 3,827,587 | 8/1974 | Liberman et al. | 414/420 |
| 3,942,665 | 3/1976 | Uchino | 414/499 |
| 4,104,850 | 8/1978 | Harris | 56/DIG. 2 |
| 4,255,919 | 3/1981 | Coplex et al. | 56/16.6 |

FOREIGN PATENT DOCUMENTS

| | | | |
|---|---|---|---|
| 655964 | 11/1964 | Netherlands | 414/345 |
| 538685 | 1/1977 | U.S.S.R. | 56/28 |

Primary Examiner—Paul J. Hirsch
Attorney, Agent, or Firm—Wendell Coffee

[57] ABSTRACT

Lift arms are mounted upon a cotton module builder. Cotton harvested from the field is placed into a basket which sets upon a convex guide upon a trailer. The trailer is pulled by a tractor to the module builder alongside the arms. The guide, together with the basket, is moved laterally toward the module builder. The arms are actuated to lift the basket from the guide to above the module builder. As the basket moves above the module builder a trip upon the module builder unlatches a door formed by one of the sides of the basket allowing the cotton to fall from the basket into the module builder. After the cotton has emptied into the module builder the basket is returned to the guide upon the trailer. The basket on the trailer is then moved to a harvester and refilled with harvested cotton.

6 Claims, 10 Drawing Figures

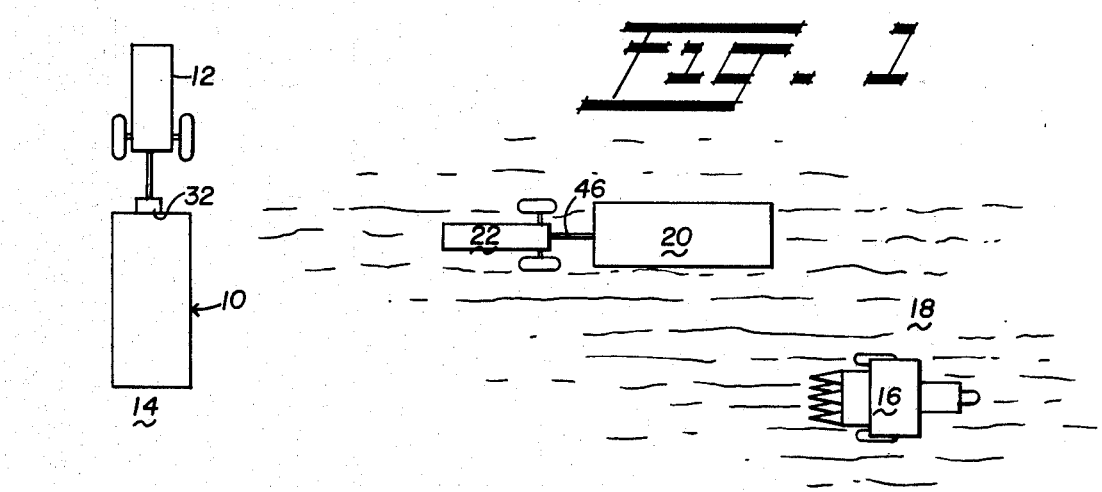
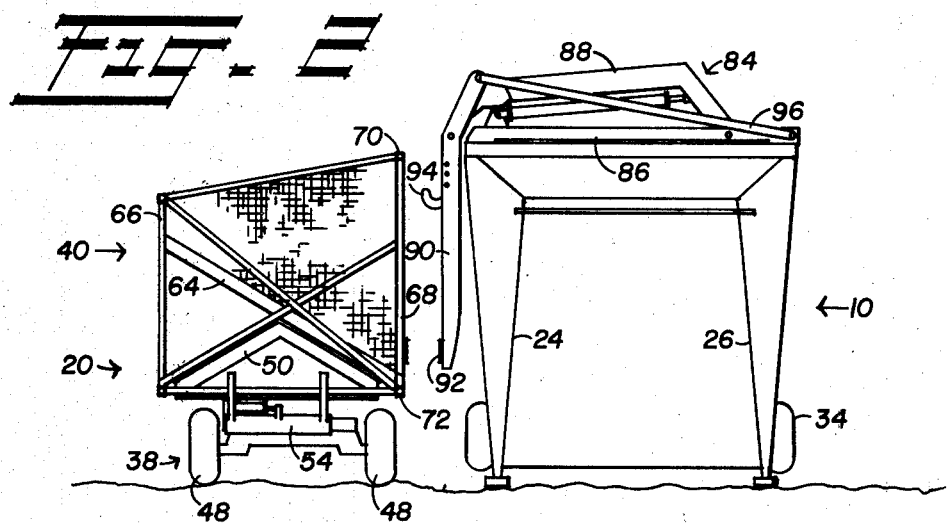
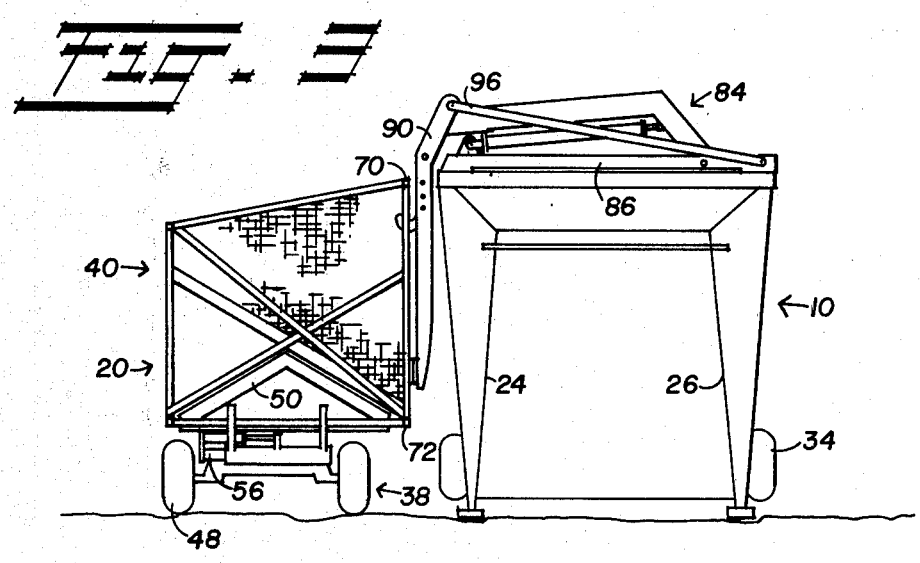

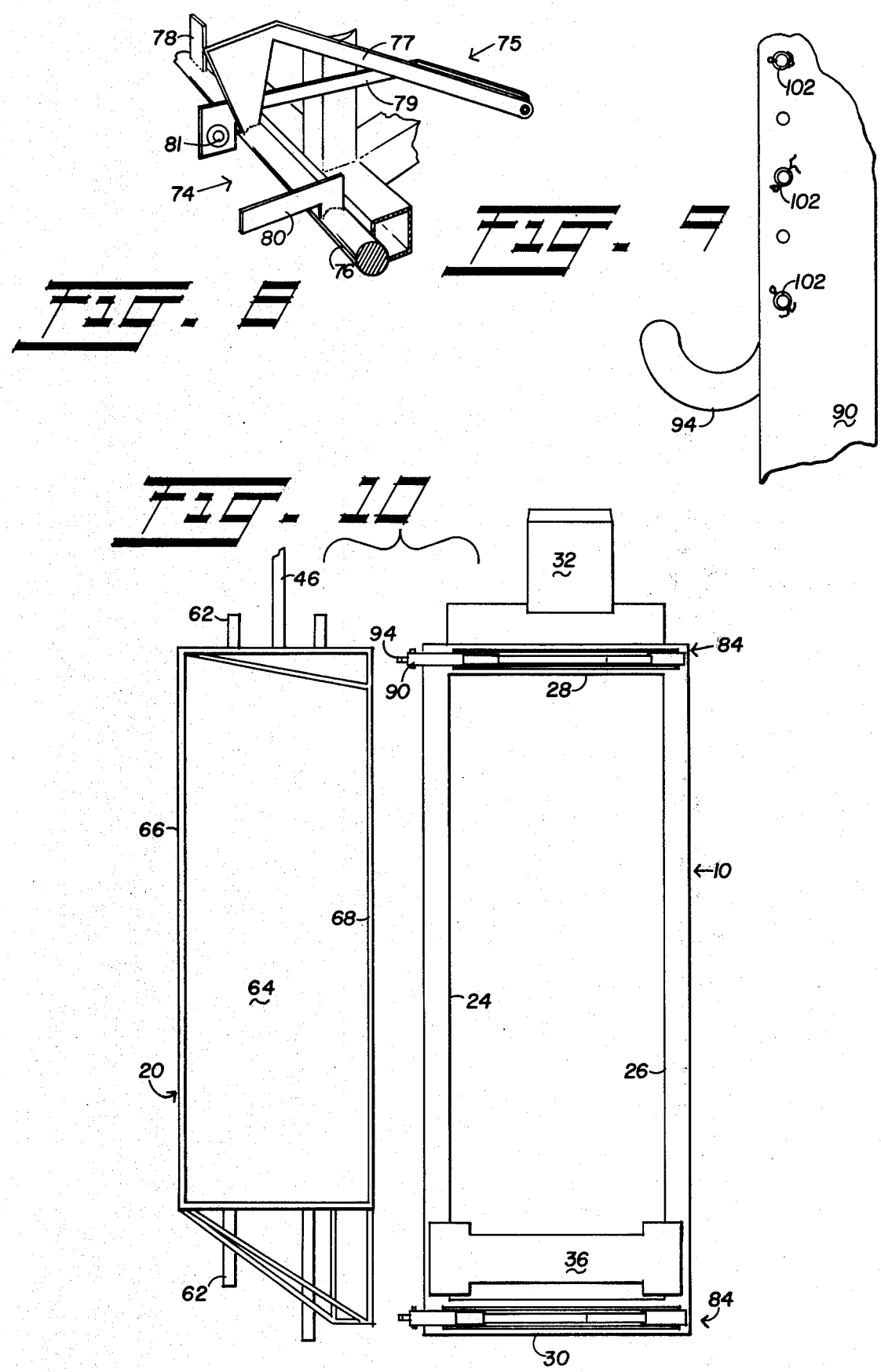

ns patent

MODULE DUMP

CROSS REFERENCE TO RELATED APPLICATIONS

None; however, applicant filed Disclosure Document No. 91,822 on June 23, 1980, which document concerns this application; therefore, by separate paper it is respectfully requested that the document be retained and acknowledgement thereof made by the Examiner (MoPEP 1706).

BACKGROUND OF THE INVENTION (1) Field of the Invention

This invention relates to cotton harvesting and more particularly to field storage of harvested seed cotton in modules before transporting to a gin to be processed.

(2) Description of the Prior Art

Before applicant made this invention, other workers in the field had developed module builders. These have become well-known to those harvesting cotton and are commercially available on the market.

Also it has been suggested by others that the harvested cotton be dumped from the cotton stripper or harvester into a basket mounted upon a trailer. From there it is transported to the module builder and dumped into the module builder. To date, the persons who have developed this equipment have always had the basket elevated and dumped by mechanisms mounted on the trailer carrying the basket. To Applicant's knowledge, there has been difficulties with a system of this nature because of the light weight of the trailer and the height of the module builder. When the basket, full of cotton, is elevated to a sufficient height to be dumped into the module builder, the support for the basket is not sufficiently stable for safe, efficient operation. Sometimes the trailers have overturned.

SUMMARY OF THE INVENTION

New and Different Function

I have invented a method and means to efficiently and economically dump the basket of harvested cotton into the module builder.

The module builder itself has sufficient weight and stability to elevate the basket of cotton to above the module builder with ample stability. Furthermore, by putting the hoist mechanism on the module builder, additional weight is added to the module builder which is desirable. (A certain amount of weight is necessary on the module builder to obtain the desired packing action without physically lifting the module builder from the ground). Also without the trailer carrying the additional weight of the hoist mechanism, the trailer can be built lighter. It is desirable for the trailer to the lighter because it is necessary for the trailer to travel over rough terrain and through cultivated fields in the basic operation.

Thus it may be seen that the total function of my invention far exceeds the sum of the functions of the individual elements such as baskets, hoists, trailers, etc.

Objects of the Invention

An object of this invention is to harvest cotton and to make a module thereof.

Another object of this invention is to transport harvested cotton from a cotton harvester to a module builder and to dump the harvested cotton into the module builder.

Further objects are to achieve the above with a device that is sturdy, compact, durable, lightweight, simple, safe, efficient, ecologically compatible, energy conserving, and reliable, yet inexpensive and easy to manufacture, install, adjust, operate and maintain.

Other objects are to achieve the above with a method that is ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a schematic plan view showing a cotton harvester, module builder, and trailer.

FIG. 2 is a rear elevational view of the module builder with a trailer alongside.

FIG. 3 is a rear elevational view similar to FIG. 2 but showing the guide and basket of the trailer shifted to a hook-engaging position.

FIG. 8 is a detail of the trip mechanism for unlatching the door of the basket.

FIG. 9 is a detail of the hook upon the lift arm.

FIG. 10 is a top plan view of the trailer alongside the module builder in the position as seen from the rear in FIG. 2.

DESCRIPTION OF THE PREFERRED EMBODIMENT

Figure 4:
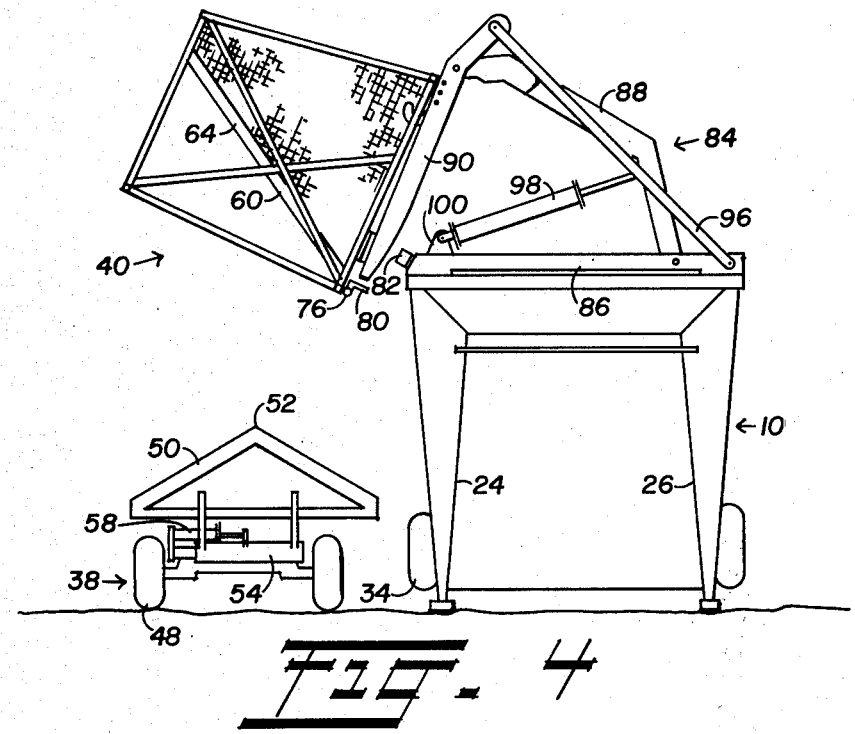
FIG. 4 is a rear elevational view similar to FIG. 2 showing the basket lifted free of the guide on the trailer.

Referring to FIG. 1, there may be seen schematically represented module builder 10 attached to tractor 12. The tractor 12 supplies power to the module builder and moves it from one location to another as necessary. The module builder and tractor is located upon turnrow 14 or otherwise in an area that did not flood during wet weather and had sufficiently good traction so that a module could be picked up by conventional equipment.

Cotton stripper or harvester 16 is also seen in FIG. 1. The stripper 16 harvests seed cotton from cotton stalks in field 18. Trailer 20 is towed by tractor 22. In operation the harvester 16 transfers harvested seed cotton to the trailer 20. The trailer 20 transports the harvested seed cotton to the module builder 10 where it is dumped into the module builder 10 and formed into a module.

The module builder 10 is conventional, having sidewalls 24 and 26. The module builder also has a front wall 28, back gate 30, and operator's station or cab 32.

Wheel means 34 attached to the sidewalls 24 and 26 are for raising the module builder 10 and moving it to another location. Packer 36 on the module builder is mounted between the two sidewalls 24 and 26 and is mounted for movement from the rear to the front and back, so that the seed cotton within the module builder may be packed to such a degree that the module may be lifted onto a module mover to be moved from the field where it is formed to the cotton gin where the seed cotton will be processed.

Those having ordinary skill in the cotton harvesting art will understand that what has been described above is conventional and is available upon the market; i.e., trailers to transport the harvested cotton from the harvester to the module builder are available but not, of course, the improved trailer as specifically described in the later description of my trailer 20.

The trailer 20 includes running gear 38 and basket 40. The running gear 38 basically is a frame, the principal elements of which are front axle 42 and rear axle 44. Tongue 46 is attached to the front axle and provides means extending to the tractor 22 for pulling the trailer to a desired location. Four wheels 48 are on the front and rear axles. Convex guide 50 is mounted upon the running gear 38. The guide 50 is basically in the form of longitudinal ridge 52. The ridge is mounted upon slides 54. The slides 54 are mounted to slide laterally or transversly on rails 56 which are connected to the frame. One of the rails 56 is mounted upon the rear axle 44 and one of the rails is mounted adjacent to the front axle 42. Hydraulic cylinder 58 connects each of the slides 54. Therefore, activation of the cylinders 58 will cause the slides and thus the guide 50 to move laterally upon the rails 56, which are transverse of the running gear 38. Basket 40 sets upon the convex guide 50 and therefore operation of the hydraulic cylinders 58 will also shift the basket laterally of the running gear 38.

Thus the cylinders 58 form at least a part of shift means interconnecting the guide and frame of the running gear for shifting or moving the guide laterally on the frame.

The basket 40 has concave bottom 60. The concave bottom 60 has a co-relative shape to the ridge 52 of the convex guide 50. Therefore, the basket will be guided into the proper position and will properly seat upon the running gear. Since the ridge 52 is V-shaped, the bottom 60 will be an inverted valley. In addition, the frame will have a front and rear guides 62. The basket will have a sloping diagonal floor 64. One half of the floor will form one half of the inverted valley which is the concave bottom 60. The basket will have two sides, one side the high side (when dumping) 66, will be on that side of the sloping floor 64 which is higher, and the hinged side 68 will be hinged or pivoted at the top 70. Latch 74 will extend along the bottom 72 of hinged side 68. Therefore, when the latch 74 is released, the pressure of the seed cotton within the basket will push the hinged side or door 68 open, allowing the cotton to slide out across the sloping floor 64.

The latch 74 includes shaft 76 extending the length of the basket. Fingers 78 on the shaft extend upward against the bottom 72 of the hinged side 68 holding or latching the side in closed position. However, lever 80 upon the shaft extends outwardly from the basket. The lever 80 is designed to engage operator 82 upon the side of the module builder. When the lever 80 engages the operator 82, it rotates the shaft 76 rotating the fingers 78 away from the bottom 72 allowing the hinged side 68 to open. The location of the lever 80 and the operator 72 are such that the lever does not engage the operator until the basket is above the top of the sidewall 24. Therefore, it may be seen that when the lever 80 engages the operator 82 this is in effect a detection of the fact that the basket is above the module builder and responsive to this detection of the position of the basket, the side or the door is opened to dump the cotton into the module builder.

Over center cam 75 interconnects the shaft 76 and the bottom 72 of the hinge side 68. As seen, the cam mechanism includes an arm 77 which is attached, as by welding, to the shaft 76. At the distal end of the arm 77 it is pivoted to door pitman 79. The door pitman itself is pivoted at its end 81 to the bottom 72. Therefore it may be seen when the door is closed, that the pressure of the cotton within the basket will tend to hold the latch in closed position, therefore, tightly holding the fingers 78 against the bottom. However, rotation of the lever 80 will upset the over center cam mechanism and permit the shaft 76 to rotate freely. Also it may be seen that rotation of the lever 78 in the opposite direction will close the door; i.e., operation of lever 80 through the shaft 76 will rotate the arm 77 to pull the door closed by the door pitman 79.

The length of the basket 40 is at least three fourth's of the length of the sidewalls 24 and 26 of the module builder. Therefore, the cotton dumped from the trailer will substantially be distributed throughout the module builder without having to dump part of it in the front and part of it in the rear. In fact, the basket is designed so that there is a blank space or a portion in the rear which will not strike the packer 36 if the packer is positioned in the rear (away from the cab 32) of the module builder 10.

Except for the mating of the convex guide 50 and the concave bottom 60, the basket is otherwise not latched or held on the running gear. Therefore, the basket can be raised from the running gear without the necessity of lifting the weight of the running gear. The basket can be set back on the running gear and it will be properly positioned thereon because of the convex guide. Hydraulic power to operate the cylinders 58 is conveniently supplied by the towing tractor 22 as is conventional in agricultural equipment.

The module builder 10 has two lift arm assemblies 84 attached to it, one assembly at the front of the module builder which is substantially at the front wall 28 and the other assembly at the back of the module builder which is substantially at the back gate 30. This leaves the entire length of the module builder between the front wall 28 and the back gate 30 free so that the packer 36 upon its carriage may be moved forward and backward along the module builder as is conventional with all module builders on the market today.

Each of the lift arm assemblies 84 are substantially identical and include base bar 86 which is securely attached to the top of the module builder 10. The main arm 88 is pivoted to the base bar 86, spaced a short distance inboard from the sidewall 26.

The distal end of the main arm 88 is pivoted to lift arm 90. Lift pad 92 is at the lower end of the lift arm 90. In use, the pad 92 bears against the basket 40 near the bottom side 72, so as it is raised, the basket has the proper tilt or proper angle. However, the pad 92 does not interfere with the opening of the hinged side 68. Hook 94 is attached to the lift arm 90 about half way between the top and bottom thereof. Tilt pitman 96 has one end pivoted to the top of the lift arm 90 and the other end pivoted to the extreme outboard end of base bar 86. The main arm 92 is pivoted to the lift arm 90 about half way between the hook 94 and the top thereof. Long cylinder 98 is pivoted to the extreme end of the base bar 86 away from where the tilt pitman 96 is pivoted; i.e., the long cylinder is pivoted to base bar 86 above and outboard of sidewall 24. Ear 100 is connected to the base bar 86 for this purpose. The other end of the long cylinder 98; i.e., the plunger of the cylinder, is pivoted to the main arm 88 near the point of pivoting to the base bar. It will be noted that main arm 88 has an angle thereto which is to say it is cranked.

Figure 5:
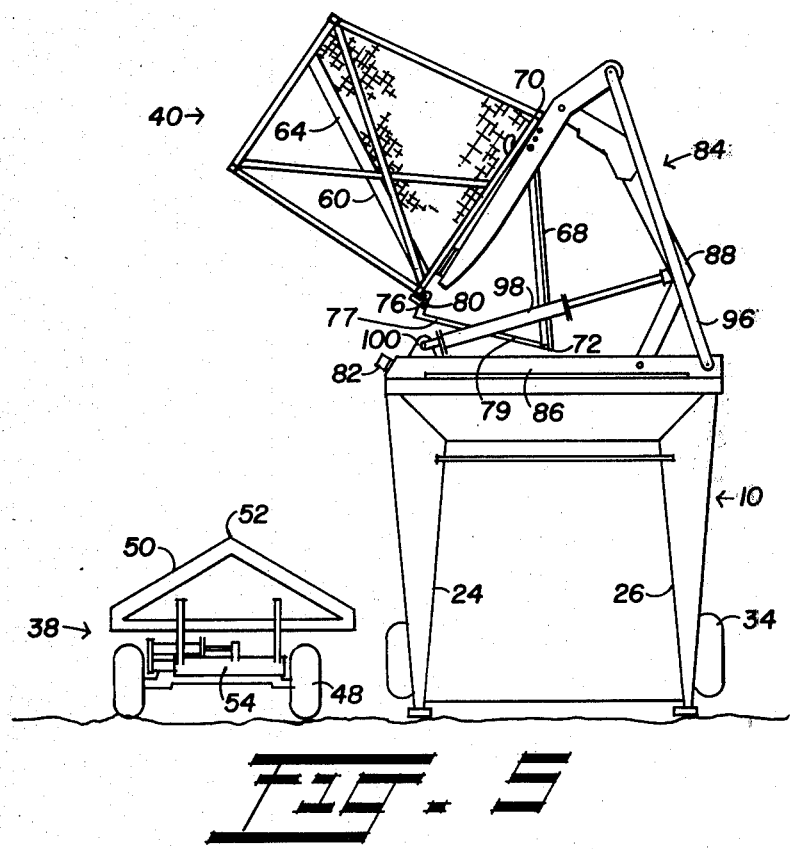
FIG. 5 is a rear elevational view similar to FIG. 2 showing the basket in the full elevated position with the basket door open in the dumping position.
Figure 7:
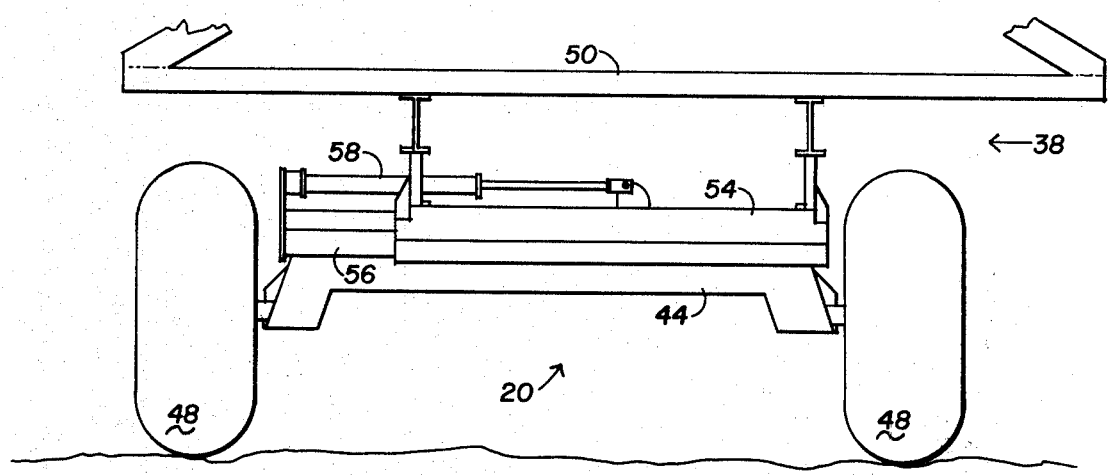
FIG. 7 is a partial rear elevational view of the trailer showing the shift means for shifting the guide (and thus the basket) upon the running gear of the trailer.

The sequence of events of the movement of the lift arm assembly 84 is seen in FIGS. 3, 4, and 5. As the long cylinder 98 is extended it causes the main arm 88 to rotate and the rotation lifts the lift arm 90. The tilt pitman 96 causes the lift arm 90 to tilt the basket 40 as it rises so that when the basket is fully lifted it is tilted so that the cotton readily slides along the floor 64 into the module builder as seen particularly in FIG. 5.

As seen in FIG. 9, the position of the hooks 94 upon the lift arm may be adjusted. There are a series of holes upon the structural member of the lift arm 90, and pins 102 are inserted through the desired holes in a position to correspond to holes within the hook 94.

Figure 6:
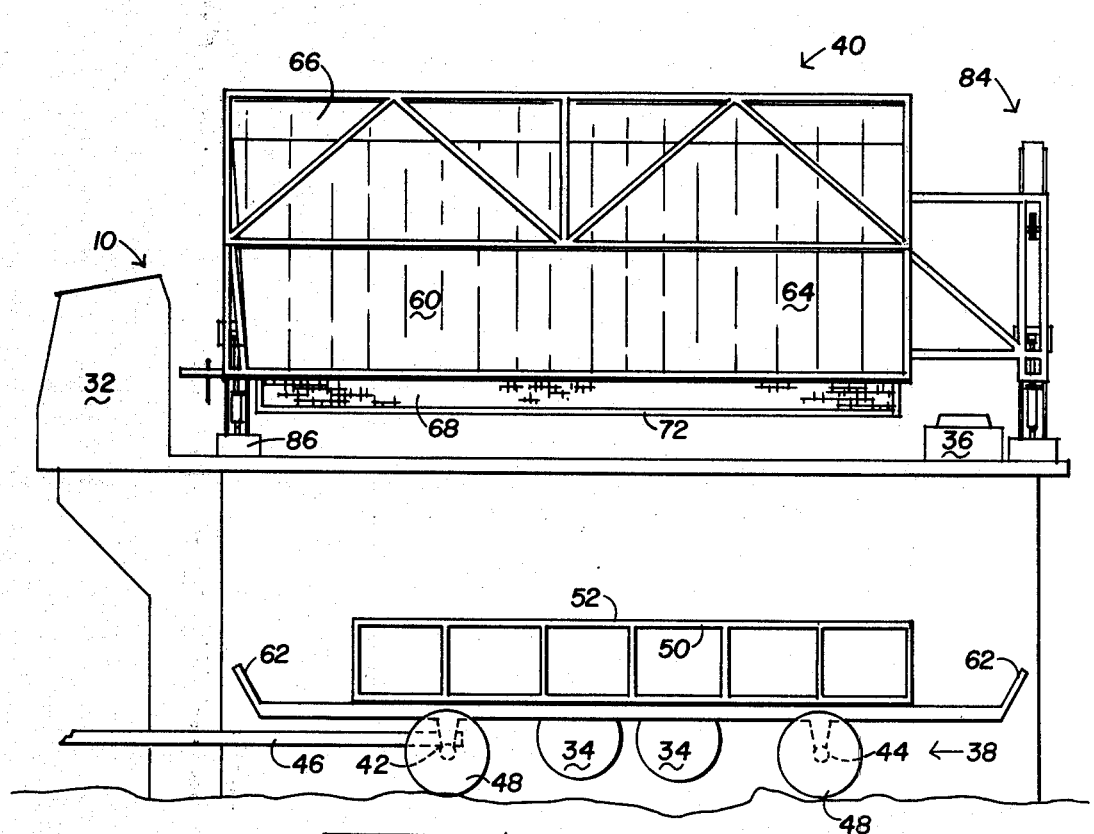
FIG. 6 is a side elevational view showing the running gear, basket, and module builder in the position as seen from the rear in FIG. 5.

To explain the operation completely, the seed cotton is stripped by harvester 16 from the stalks in the field 18 and is transferred from the harvester 16 to the trailer 20. The trailer then is moved adjacent to the side wall 24 of the module builder 10. When the trailer is positioned along the module builder 10, then the basket 40 is shifted laterally upon the running gear 38 of the trailer 20 so that hooks 94 engage suitable structure upon the basket 40. Pads 92 upon the lower portion of the lift arm 90 engage the lower portion of the basket. Then extension of long cylinder 98 will cause the lift arm 90 to carry the basket 40 upward. The upward movement of the basket 40 disengages it from the convex guide 50 upon the trailer or running gear 38. As the basket 40 is lifted and moves above the sidewall which is above the module builder, the lever 80 upon the basket latch is engaged by an operator 82 upon the module which opens the latches 74 allowing the hinged side 68 to swing open as seen in FIGS. 5 and 6 and dump the cotton into the module builder. Then after the cotton is completely dumped, contraction of the long cylinders 98 will reverse the travel of the basket 40 so that it is again lowered. The hinged side 68 is closed and latched shut by the cam mechanism 75. The mating of convex guide 50 and concave guide 60 upon the running gear 38 position the basket. After it has been seated upon the running gear and the arms completely lowered, the guide and basket are again moved laterally to center the basket on the trailer 20. The trailer 20 is moved by tractor 22 away from the module builder and back to the harvester 16 or another similar harvester (not shown) to receive another load of seed cotton to be returned to the module builder.

Those having skill in the art will understand that the capacity of the trailer will be more than the capacity of the storage bin upon the harvester and therefore the trailer can receive cotton from two or three harvesters 16 before the necessity of dumping it into the module builder 10. Once the cotton is dumped into the module builder, the cotton is packed in the module builder by the packer 36 as is conventional. The operation of the lift arm assembly and the packer is all controlled by hydraulic controls by an operator in cab 32 as is conventional and well-known with module builders.

Thus it may be seen that I have provided an efficient, safe, stable means for dumping cotton from a trailer basket into a module builder.

As an aid to correlating the terms of the claims to the exemplary drawings, the following catalog of elements is provided:

| 10 | module builder | 62 | front & rear guides |
|----|----------------|----|---------------------|
| 12 | tractor | 64 | floor |
| 14 | turnrow | 66 | high side (when dumping) |
| 16 | cotton stripper | 68 | hinged side |
| 18 | field | 70 | top |
| 20 | trailer | 72 | bottom of side |
| 22 | tractor (trailer) | 74 | latch |
| 24 | side wall | 75 | cam mechanism |
| 26 | side wall | 76 | shaft |
| 28 | front wall | 77 | arm |
| 30 | back gate | 78 | finger |
| 32 | cab | 79 | door pitman |
| 34 | wheel means | 80 | lever |
| 36 | packer | 81 | end of door pitman |
| 38 | running gear | 82 | operator |
| 40 | basket | 84 | lift arm assembly |
| 42 | front axle | 86 | base bar |
| 44 | rear axle | 88 | main arm |
| 46 | tongue | 90 | lift arm |
| 48 | wheels | 92 | pad |
| 50 | convex guide | 94 | hook |
| 52 | ridge | 96 | tilt pitman |
| 54 | slides | 98 | long cylinder |
| 56 | rails | 100 | ear |
| 58 | cylinder | 102 | pin |
| 60 | concave bottom | | |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. The process of harvesting seed cotton including:
    a. stripping bolls of seed cotton from the cotton stalk by harvester
    b. transferring the stripped seed cotton to a trailer having a basket mounted on a running gear, and
    c. moving the trailer to a module builder;
  wherein the improved method of dumping the cotton from the trailer into the module builder comprises:
    d. attaching hooks from the module builder onto the basket,
    e. lifting the basket to above the module builder by the hooks on the module builder, then
    f. tilting the basket, and
    g. dumping the seed cotton into the module builder.

2. The invention as defined in claim 1 having limitations a–g, further comprising:
    h. after the trailer is moved to the module builder, then
    i. moving the basket laterally on the running gear to aid in attaching the hooks onto the basket.

3. The invention as defined in claim 1 having limitations a–g, further comprising:
    h. detecting when the basket is above the module builder, and then
    i. opening a door on the basket to release the cotton into the module builder.

4. The invention as defined in claim 1 having limitations a–g, further comprising:
   h. separating the basket from the running gear when the basket is lifted.
5. The invention as defined in claim 4 having limitations a–h, further comprising:
   i. after the trailer is moved to the module builder, then
   j. moving the basket laterally on the running gear to aid in attaching the hooks onto the basket.
6. The invention as defined in claim 5 having limitations a–j, further comprising:
   k. detecting when the basket is above the module builder and then
   l. opening a door on the basket to release the cotton into the module builder.

* * * * *